United States Patent
Gochenour et al.

(12) 
(10) Patent No.: US 6,415,899 B1
(45) Date of Patent: Jul. 9, 2002

(54) MOTOR VEHICLE FRICTION CLUTCH WITH AN OUTWARDLY DISPOSED INITIAL ENGAGEMENT REGION

(75) Inventors: Daniel V. Gochenour, Auburn; Arif Mirza, Fort Wayne, both of IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/686,230

(22) Filed: Oct. 11, 2000

(51) Int. Cl.$^7$ ............................................... F16D 13/71
(52) U.S. Cl. ................................ 192/70.14; 192/107 R
(58) Field of Search ............................ 192/52.2, 70.14, 192/70.15, 107 R, 107 C, 109 R

(56) References Cited

U.S. PATENT DOCUMENTS

| | | | | | |
|---|---|---|---|---|---|
| 2,902,130 | A | * | 9/1959 | Halberg et al. ......... | 192/107 R |
| 3,548,988 | A | * | 12/1970 | Armstrong ............... | 192/107 R |
| 3,584,719 | A | * | 6/1971 | Upchurch ................. | 192/70.14 |
| 3,624,770 | A | * | 11/1971 | Fujita et al. ............ | 192/107 X |
| 3,897,859 | A | * | 8/1975 | Norcia .................... | 192/107 C |
| 3,982,611 | A | * | 9/1976 | Gannon ................... | 192/107 R |
| 5,337,873 | A | * | 8/1994 | Thirion de Briel ..... | 192/107 R |
| 5,732,809 | A | * | 3/1998 | Drexl ....................... | 192/70.14 |
| 6,012,562 | A | * | 1/2000 | Hagnere et al. ......... | 192/70.18 |
| 6,138,806 | A | * | 10/2000 | Schierling ................ | 192/70.14 |

FOREIGN PATENT DOCUMENTS

JP      6-17841    * 10/1983

* cited by examiner

*Primary Examiner*—Rodney H. Bonck
(74) *Attorney, Agent, or Firm*—Kevin M. Hinman

(57) ABSTRACT

A pressure plate for a motor vehicle includes an annular disc having a first frictional engagement surface. The first frictional engagement surface has an annular initial engagement region substantially normal to the axis of rotation, and a secondary engagement region disposed radially inwardly of the initial engagement region defining a concave surface within the pressure plate.

12 Claims, 2 Drawing Sheets

MOTOR VEHICLE FRICTION CLUTCH WITH AN OUTWARDLY DISPOSED INITIAL ENGAGEMENT REGION

BACKGROUND OF THE INVENTION

1. Field of the Invention

The invention relates to a pressure plate configuration for a motor vehicle friction clutch and in particular to a configuration of pressure plate friction engagement surfaces.

2. The Prior Art

A motor vehicle friction clutch assembly commonly includes a clutch cover fastened to a flywheel, a pressure plate rotatably fixed yet axially displaceable relative to the clutch cover, and a prestressed apply spring acting against the cover to bias the pressure plate toward the flywheel. The apply spring may take the form of a diaphragm spring disposed between the cover and the pressure plate. A driven disc is axially disposed between the pressure plate and the flywheel, and is slidably disposed over the splines of the transmission input shaft. The apply spring forces the pressure plate toward the flywheel, compressing the driven disc therebetween. The frictional linings of the driven disc are engaged by the engagement surfaces of the pressure plate and the flywheel. In the engaged condition, the clutch prevents relative rotation between the engine crankshaft to which the flywheel is fixed, and the transmission input shaft, communicating the engine torque therethrough. A release bearing is used to overcome the apply spring load against the pressure plate to achieve clutch release. In the clutch released condition, the engine is able to rotate independently of the transmission input shaft, as is commonly required when selecting transmission gears. The release bearing is typically displaced to the release position by a pivotable release bearing fork which is connected through a mechanical or hydraulic linkage to an operator displaced foot pedal.

Clutches are selected for particular applications based largely on the magnitude of torque they can sustain before slipping, or the torque capacity of the clutch. For any given clutch, it is generally desired to maximize its torque capacity, without negatively affecting other important performance characteristics of the clutch, such as resistance to wear, and ease of engagement. Variables which influence the torque capacity of a clutch include:

- the pressure plate load or clamp load, which is primarily developed by the apply spring;
- the number of friction surfaces;
- the coefficient of friction between the engaging friction surfaces; and
- the effective torque arm length of the friction surfaces.

Torque capacity is increased by increasing any one of the above variables. There are, however, limits on how much any of these factors can be changed. For example, there is a practical limit to how much pressure plate loads can be increased, at least for clutches which are released through a manual pedal system. Increases in pressure plate loads result in increased release loads, and correspondingly higher pedal loads. Excessively high pedal loads would make it difficult for a vehicle operator to release the clutch.

The number of friction surfaces is increased beyond the two associated with a single driven disc in some heavier duty clutches by providing a second driven disc and an intermediate plate in the clutch assembly. However, it is generally impractical to alter the number of driven discs employed for a given clutch/transmission combination due to packaging constraints such as the length of the transmission input shaft and the length of the bell housing which connects the transmission with the engine block, and the location of the release fork.

Changing the friction material comprising the friction linings to achieve a higher coefficient of friction is a potential option. However, the material chosen must not negatively affect either the engagement quality, nor the wear life of the clutch. These constraints have the effect of substantially limiting increases which can be provided in the coefficient of friction.

Changing the effective torque arm length of the friction surfaces can be accomplished by increasing the diameter of the flywheel, the driven disc, the pressure plate, and the clutch cover. However, such changes are undesirable both from a packaging perspective as well as due to the undesired increased rotational inertia of the clutch. It has been noted that the effective torque arm length of the friction surfaces, particularly at the point of initial engagement, is typically much less than it could be, as the initial engagement occurs over less than the full area of the friction material pads and commonly occurs at a location other than an outer periphery of the friction material. The length of the effective torque arm is a function of the engagement between the driven disc and the engagement surface of the pressure plate. Most commonly, such surfaces are formed flat and normal to the axis of rotation. If the engaging surfaces are perfectly flat and parallel to each other, a nominal effective torque arm length will result. However, variance in the smoothness or flatness surface of the friction linings, and variance in the smoothness or flatness of the engagement surface will cause the length of the torque arm to vary. In one known pressure plate, the engagement surface of the plate nominally tapers 0.002 inches (0.05 mm) on one side from an outer perimeter edge to an inner perimeter edge, to provide a slightly concave shape at nominal. Such a shape does not overcome much of a variance in flatness of the friction material. Further, the amount of taper is allowed to vary from nominal by plus or minus 0.003 inches (0.08 mm). At the outer limit of the permitted taper, the engagement surface would be slightly convex, tending to engage even perfectly flat friction material proximate to the inner periphery of the pressure plate, with the resultant torque arm length being at its minimum. The variation of both the friction material and the engagement surfaces can result in the effective torque arm length being significantly shorter than nominal, at least on initial engagement. In such a circumstance, more clutch slippage than is desirable may occur upon initial clutch engagement, and may even reduce the torque capacity of the fully engaged clutch.

It has been noted that the coefficient of friction between the friction material and the frictional engagement surface is lower when the clutch is new, and increases after several clutch engagements. Fewer engagement cycles are needed to increase the coefficient of friction if the force per unit area is relatively high. Therefore, initial engagement torque capacity could be increased more quickly by initially engaging just a portion of the friction material.

Known clutch construction has been shown to be disadvantageous in connection with maximizing clutch torque capacity in that the torque capacity for a given clutch configuration is less than it potentially could be, particularly for initial engagements of the clutch. It is desired to provide a clutch which maximizes the effective torque arm length at the clutch's friction engagement interface early in the life of the clutch.

SUMMARY OF THE INVENTION

A friction clutch assembly for a motor vehicle includes a clutch cover configured for fastening to a flywheel for rotation therewith about an axis of rotation. A pressure plate is disposed on the clutch cover and is connected to the clutch cover for rotation therewith. The pressure plate is axially displaceable relative to the clutch housing, and has a first side disposed toward the clutch cover. The pressure plate has a frictional engagement surface on a second side opposite the first side. An apply spring is disposed between the clutch housing and the pressure plate in a prestressed condition. The apply spring biases the pressure plate away from the clutch housing. The pressure plate friction engagement surface has an annular initial engagement region substantially normal to the axis of rotation extending between a first inner diameter and a first outer diameter. The first outer diameter is proximate to an outer periphery of the pressure plate. The pressure plate also has an annular secondary region radially within the initial engagement region. The annular secondary engagement region defines a concave surface within the pressure plate. The annular second engagement region has a second outer diameter proximate to the first inner diameter, and has a second inner diameter proximate to an inner periphery of the pressure plate.

A pressure plate for a motor vehicle includes an annular disc having a first frictional engagement surface. The first frictional engagement surface has an annular initial engagement region substantially normal to the axis of rotation, and a secondary engagement region disposed radially inwardly of the initial engagement region defining a concave surface within the pressure plate.

The inventive clutch maximizes the effect of torque arm length of the clutch at the clutches friction engagement interface early in the life of the clutch.

BRIEF DESCRIPTION OF THE DRAWINGS

Exemplary embodiments of the invention will be explained in detail by reference to the drawings, in which.

DETAILED DESCRIPTION OF THE PREFERRED EMBODIMENT

Figure 1:
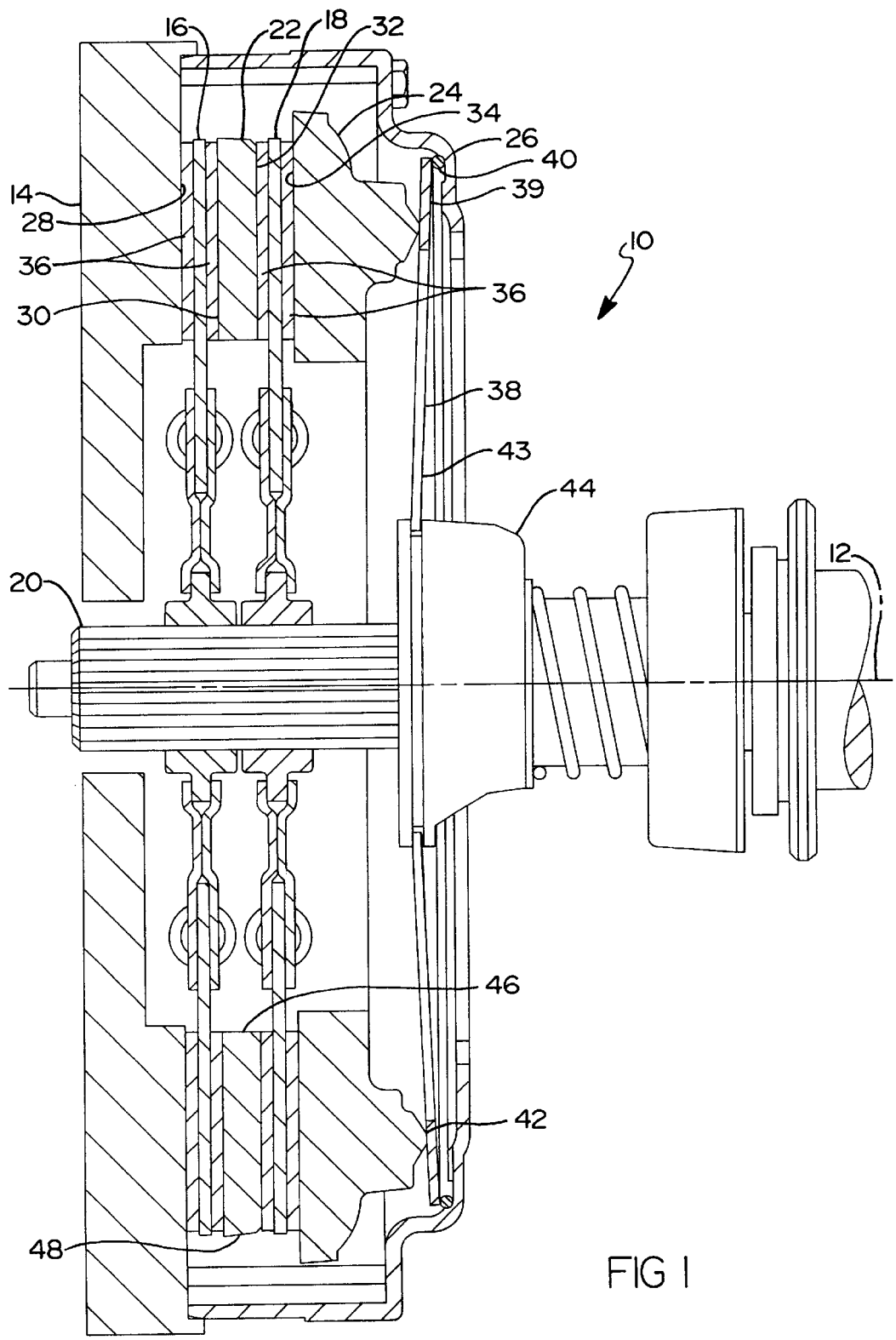
FIG. 1 is a sectional side view of a clutch assembly.
Figure 2:
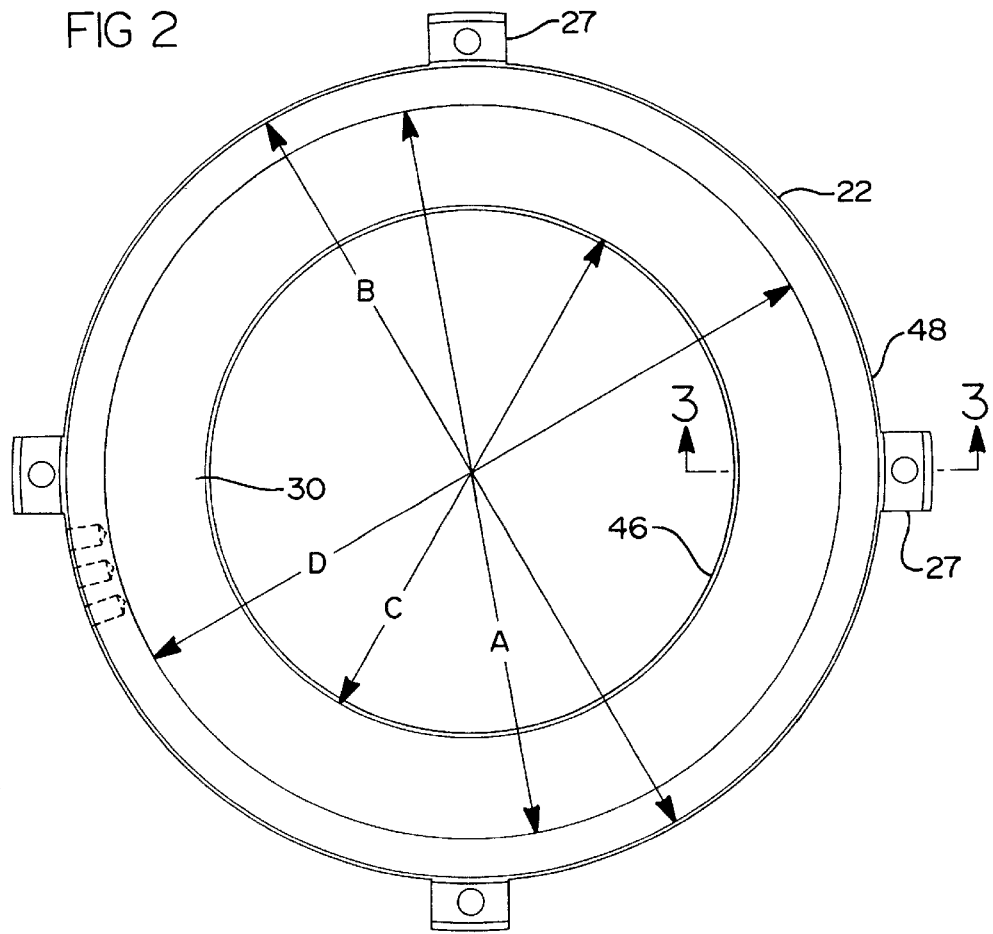
FIG. 2 is an axial end view of a clutch intermediate pressure plate.

FIG. 1 shows a motor vehicle friction clutch assembly 10 centered on an axis of rotation 12. A flywheel 14 is fixed to an engine crankshaft (not shown) of an internal combustion engine. The clutch assembly 10 rotates with the crankshaft about axis 12. A first driven disc 16 and a second driven disc 18, each having a splined hub, are slidably disposed on a splined transmission input shaft 20 for unitary rotation therewith. Driven discs 16 and 18 are interleaved between flywheel 14, an intermediate pressure plate 22 and a principal pressure plate 24. Both the intermediate and principal pressure plates 22 and 24 are rotatably fixed, and axially displaceable, relative to a clutch cover 26 which is fixed to flywheel 14 and extends over pressure plates 22 and 24 and driven discs 16 and 18. Such a pressure plate to cover connection can be provided by a plurality of leaf springs (not shown) connecting the pressure plates with the cover 26 and each other, or, in the alternative by radially extending lugs 27 on the pressure plates 22 and 24 as best shown in FIG. 2.

Flywheel 14 and pressure plates 22 and 24 each have associated frictional engagement surfaces. Flywheel 14 has first frictional engagement surface 28, intermediate pressure plate 22 has second and third frictional engagement surfaces 30 and 32 on the flywheel side and the primary pressure plate side respectively, and principal pressure plate 24 has a fourth frictional engagement surface 34.

Friction pads 36 formed of friction material are fixedly disposed on both sides of driven discs 16 and 18 for engagement with engagement surfaces 28, 30, 32 and 34.

An apply spring in the form of a diaphragm spring 38 biases pressure plates 22 and 24 toward flywheel 14, compressing driven discs 16 and 18 therebetween, and thereby rotatably fixing transmission input shaft 20 to flywheel 14 and the engine crankshaft. An outer peripheral region of an annular portion 39 of diaphragm spring 38 engages a support ring 40 disposed against cover 26. An inner peripheral region of the annular portion of diaphragm spring 38 engages an engagement crown 42 formed on principal pressure plate 24. Fingers 43 of spring 38 are engaged by release bearing assembly 44. Displacement to the right in FIG. 1 of a release bearing assembly 44 and the associated ends of fingers 43 deflects the annular portion 39 of spring 38 to unload pressure plates 22 and 24.

Intermediate pressure plate 22 has an inner perimeter 46 and an outer perimeter 48 defining its radial inner and outer extremes. Principal pressure plate 24 and flywheel 14 similarly has inner and outer perimeters. In the embodiments illustrated and described herein, inner perimeter 46 has a diameter approximately equal to a diameter defined by an inner periphery of friction pad 36. Outer perimeter 48 has a diameter approximately equal to a diameter defined by an outer periphery of friction pad 36.

Figure 3:
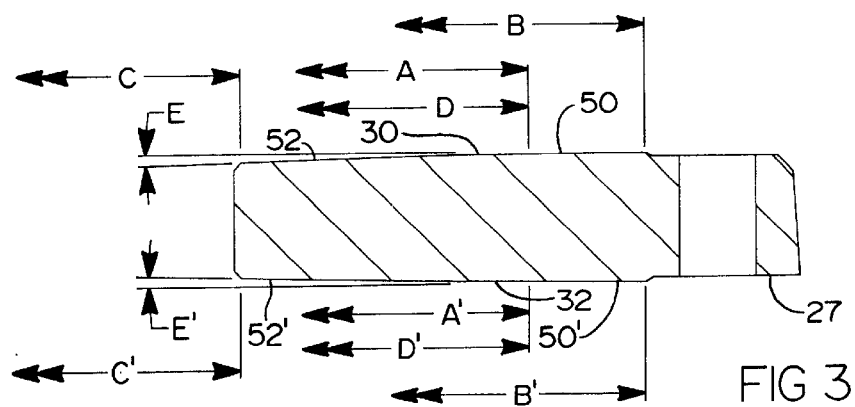
FIG. 3 is a sectional view of the pressure plate of FIG. 2 in the direction of arrows 3.

First, second, third and fourth frictional engagement surfaces 28, 30, 32 and 34 respectively each have an annular initial engagement region. Initial engagement regions 50 and 50' of engagement surfaces 30 and 32, as best shown in FIGS. 2 and 3, are identical to corresponding initial engagement regions of engagement surfaces 28 and 34 of flywheel 14 and principal pressure plate 24. Initial engagement regions 50, 50' are most proximate to outer perimeter 48. Engagement surfaces 30 and 32 also each have a secondary engagement region 52 and 52' proximate to inner perimeter 46 and characterized by a concave frustaconical surface. As best shown in FIGS. 2 and 3, the initial engagement regions 50 and 50' are immediately adjacent secondary engagement regions 52 and 52'. However, it should be appreciated that there may be a transition region disposed between initial engagement regions 50 and 50' and secondary engagement regions 52 and 52'. Additionally, it should be appreciated that secondary engagement regions 52 and 52' may have a shape other than a concave frustaconical surface. For example, secondary engagement regions 52 and 52' may be entirely comprised of a radiused profile, or may be a combination of a radius and the angled frustaconical surface. It should also be further appreciated that significant benefit is still achieved even without forming distinct initial engagement regions on each of surfaces 28, 30, 32 and 34. For example, surface 28 could be relatively flat as it would be on a conventional flywheel.

Initial engagement regions 50 and 50' have inner diameters A and A' and outer diameters B and B'. Secondary engagement regions 52 and 52' have inner diameters C and C' and outer diameters D and D'. There is an axial taper offset E between diameters C and D and E' between C' and D'.

Exemplary values for diameters for A, A', B, B', C, C', D and D' are 7.0 inches (178 mm) for A and A', 7.7 inches (195 mm) for B and B', 5.0 inches (127 mm) for C and C' and 7.0 inches (178 mm) for D and D'. An exemplary offset value of E and E' is 0.006 inches (0.15 mm).

The inventive clutch assembly 10 operates in the following manner. In an engaged condition, diaphragm spring 38 acts on pressure plate 24 to compress driven discs 16 and 18 between pressure plate 24, flywheel 14 and intermediate pressure plate 22. Driven discs 15 and 18 are resultantly rotatively locked to each other and to flywheel 14 and pressure plates 22 and 24. With clutch assembly 10 in an engaged condition, transmission input shaft 20 rotates with flywheel 14. To release clutch assembly 10, release bearing assembly 44 is axially displaced or pulled away from flywheel 14 by conventional means such as an operator actuated pedal linkage (not shown) in combination with a clutch release fork (not shown). As release bearing 44 is moved away from flywheel 14, the radially inner most tips of fingers 43 are displaced therewith causing fingers 43, and in turn annular portion 39, to deflect away from flywheel 14. The deflection of annular portion 39 away from flywheel 14 relieves the load against pressure plate 24, allowing principal pressure plate 24 and intermediate pressure plate 22 to unload driven discs 16 and 18, permitting relative rotation between driven discs 16 and 18 and pressure plates 22 and 24. Upon the release of the clutch pedal by the vehicle operator, pressure plate 24 begins moving toward flywheel 14, bringing its engagement surface 34, as well as engagement surfaces 32, 30 and 28 into engagement with friction pads 36 of driven discs 16 and 18. As the taper of engagement surfaces 28, 30, 32 and 34 is greater than the permissible variance of flatness of driven discs 16 and 18, initial engagement between surfaces 28, 30, 32 and 34 with driven discs 16 and 18 occurs at the initial engagement regions of each of surfaces 28, 30, 32 and 34. Until there have been sufficient engagements, to produce wear of friction pads 36 to conform to the shape of engagement surfaces 28, 30, 32 and 34, the engagement will be substantially limited to the initial engagement regions. Therefore, the entire clutch apply load generated by diaphragm spring 38 is distributed across the relatively small engagement area provided by the initial engagement regions, including regions 50 an 50' during the early stage of the clutch's life. The relatively high unit loading accelerates the increase in the coefficient of the friction to its maximum anticipated operating level. With additional engagements, the total engagement area of the pads with the engagement surfaces increases until substantially all of the pad areas are being employed. Providing the radially outwardly disposed initial engagement regions 50 and 50' enable the clutch break-in which occurs with the initial engagements to be controlled and to thereby greatly reduce the occurrence of clutch slippage during the clutch's early life, or break-in period.

It should be readily apparent that this concept can be employed with clutches other than those illustrated in the figures. For example, this concept can be used with a single disc clutch. Further, it can be employed in a clutch employing apply levers in combination with a plurality of compression coil angle springs. This concept is applicable to clutches having friction material made of either organic or inorganic material.

The embodiments disclosed herein have been discussed for the purpose of familiarizing the reader with the novel aspects of the invention. Although the preferred embodiments of the invention have been shown and disclosed, many changes, modifications and substitutions may be made by one having ordinary skill in the art without necessarily departing from the spirit and scope of the invention as described in the following claims.

We claim:

1. A friction clutch assembly for a motor vehicle comprising:
   a clutch cover configured for fastening to a flywheel for rotation therewith about an axis of rotation;
   a pressure plate disposed on the clutch cover and connected to the clutch cover for rotation therewith and being axially displaceable relative to the clutch housing and having a first side disposed toward the clutch cover and having a frictional engagement surface on a second side opposite the first side for engagement of a driven disc friction element;
   an apply spring disposed between the clutch housing and the pressure plate in a prestressed condition and the apply spring biasing the pressure plate away from the clutch housing; and
   the pressure plate friction engagement surface having an annular initial engagement region substantially normal to the axis of rotation extending between a first inner diameter and a first outer diameter and the first outer diameter being proximate to an outer periphery of the friction element and having an annular secondary engagement region radially within the initial engagement region defining a concave surface within the pressure plate, the annular secondary engagement region having a second outer diameter proximate to the first inner diameter and having a second inner diameter proximate to an inner periphery of the friction element.

2. A friction clutch assembly as claimed in claim 1 wherein the second annular engagement region is substantially frustaconical in shape.

3. A friction clutch assembly as claimed in claim 1 wherein the initial engagement region has a radial length at least approximately one fourth of a radial length of the secondary engagement region.

4. A friction clutch assembly as claimed in claim 1 wherein the first inner diameter is unitary with the second outer diameter.

5. A friction clutch assembly as claimed in claim 1 further comprising a flywheel to which the clutch cover is fixed, the flywheel having a radially outwardly disposed annular initial engagement region substantially normal to the axis of rotation and a secondary engagement region disposed radially inwardly of the initial engagement region defining a concave surface within the flywheel.

6. A friction clutch assembly as claimed in claim 1 further comprising an annular intermediate pressure plate disposed opposite the pressure plate from the cover, the intermediate pressure plate having oppositely facing friction engagement surfaces, each friction engagement surface having a radially outwardly disposed annular initial engagement region substantially normal to the axis of rotation and a secondary engagement region disposed radially inwardly of the initial engagement region defining a concave surface within the intermediate pressure plate.

7. A pressure plate for a motor vehicle clutch comprising an annular disc having a first frictional engagement surface for engagement of a driven disc friction element, the first frictional engagement surface having an annular initial engagement region substantially normal to the axis of rotation and the first frictional engagement surface also having a secondary engagement region disposed radially inwardly of the initial engagement region defining a concave surface within the pressure plate, with the annular initial engagement region extending between a first inner diameter and a first outer diameter and the first outer diameter being proximate to an outer periphery of the friction element and the secondary engagement region having a second outer diameter proximate to the first inner diameter and also having a second inner diameter proximate to an inner periphery of the friction element.

8. A pressure plate as claimed in claim 7 wherein the pressure plate is an intermediate pressure plate and has a second frictional engagement surface which is a mirror image of the first frictional engagement surface.

9. A pressure plate as claimed in claim 7 wherein the initial engagement region has a radial length at least approximately one fourth of a radial length of the frictional engagement surface.

10. A pressure plate as claimed in claim 7 wherein the first inner diameter is unitary with the second outer diameter.

11. A friction clutch assembly as claimed in claim 1 wherein the initial engagement region has a radial length of less than one half of a radial length of the frictional engagement surface.

12. A pressure plate as claimed in claim 7 wherein the initial engagement region has a radial length of less than one half of a radial length of the frictional engagement surface.

* * * * *